United States Patent
Allen et al.

(10) Patent No.: US 11,176,201 B2
(45) Date of Patent: *Nov. 16, 2021

(54) TECHNIQUES FOR MANAGING DATA IN A CACHE MEMORY OF A QUESTION ANSWERING SYSTEM

(71) Applicant: INTERNATIONAL BUSINESS MACHINES CORPORATION, Armonk, NY (US)

(72) Inventors: Corville O. Allen, Morrisville, NC (US); Bernadette A. Carter, Raleigh, NC (US); Rahul Ghosh, Morrisville, NC (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

This patent is subject to a terminal disclaimer.

(21) Appl. No.: 14/508,678

(22) Filed: Oct. 7, 2014

(65) Prior Publication Data

US 2016/0098634 A1   Apr. 7, 2016

(51) Int. Cl.
*G06F 16/9032* (2019.01)
*G06F 12/121* (2016.01)
*G06F 12/0811* (2016.01)
*G06F 12/0875* (2016.01)
*G06F 12/084* (2016.01)
(Continued)

(52) U.S. Cl.
CPC ...... *G06F 16/90324* (2019.01); *G06F 12/084* (2013.01); *G06F 12/0811* (2013.01); *G06F 12/0875* (2013.01); *G06F 12/121* (2013.01); *G06F 16/172* (2019.01);
(Continued)

(58) Field of Classification Search
CPC ...... G06F 17/30; G06F 17/3029; G06F 12/00; G06F 12/011; G06F 12/084; G06F 12/08758; G06F 2212/00; G06F 2212/1021; G06F 2212/283; G06F 2212/69

See application file for complete search history.

(56) References Cited

U.S. PATENT DOCUMENTS 7,577,642 B2 *  8/2009  Liu ................... G06F 17/30935
8,484,015 B1     7/2013  Wolfram et al.
(Continued)

OTHER PUBLICATIONS

Steven Garcia, "Search Engine Optimisation Using Past Queries", Ph.D. Thesis, RMIT University, Melbourne, Victoria, Australia, Mar. 30, 2007.*

(Continued)

*Primary Examiner* — Tsu-Chang Lee
(74) *Attorney, Agent, or Firm* — Brian F. Russell; Diana Roberts Gerhardt (57) ABSTRACT

A technique for caching evidence for answering questions in a cache memory of a data processing system (that is configured to answer questions) includes receiving a first question. The first question is analyzed to identify a first set of characteristics of the first question. A first set of evidence for answering the first question is loaded into the cache memory. A second question is received. The second question is analyzed to identify a second set of characteristics of the second question. A portion of the first set of evidence, whose expected usage in answering the second question is below a determined threshold, is unloaded from the cache memory.

11 Claims, 7 Drawing Sheets

(51) Int. Cl.
*G06F 16/172* (2019.01)
*G06F 16/332* (2019.01)
*G06F 16/33* (2019.01)

(52) U.S. Cl.
CPC ...... *G06F 16/3329* (2019.01); *G06F 16/3344* (2019.01); *G06F 2212/283* (2013.01); *G06F 2212/452* (2013.01)

(56) References Cited

U.S. PATENT DOCUMENTS

| | | | | |
|---|---|---|---|---|
| 9,860,894 | B2* | 1/2018 | Liu | H04L 5/001 |
| 2003/0033486 | A1* | 2/2003 | Mizrachi | G06F 12/0842 |
| | | | | 711/133 |
| 2004/0059719 | A1* | 3/2004 | Gupta | G06F 17/30457 |
| 2004/0128618 | A1* | 7/2004 | Datta | G06F 17/30902 |
| | | | | 715/234 |
| 2011/0258049 | A1* | 10/2011 | Ramer | G06F 17/30867 |
| | | | | 705/14.66 |
| 2011/0320446 | A1* | 12/2011 | Chakrabarti | G06F 17/30979 |
| | | | | 707/737 |
| 2013/0018652 | A1 | 1/2013 | Ferrucci et al. | |
| 2014/0006012 | A1 | 1/2014 | Zhou et al. | |

OTHER PUBLICATIONS

Dominguez-Sal, David et al., "Cache-aware Load Balancing for Questions Answering", Proceedings of the 17th ACM Conference on Information and Knowledge Management, CIKM 2008, Napa Valley, California, USA, Oct. 26-30, 2008.

Dominguez-Sal, David et al., "A Multi-layer Collaborative Cache for Question Answering", Euro-Par 2007 Parallel Processing, Aug. 28-31, 2007, pp. 295-306.

* cited by examiner

TECHNIQUES FOR MANAGING DATA IN A CACHE MEMORY OF A QUESTION ANSWERING SYSTEM

BACKGROUND

The present disclosure is generally directed to a question answering system and, more specifically, to techniques for managing data in a cache memory of a question answering system.

Watson is a question answering (QA) system (i.e., a data processing system) that applies advanced natural language processing, information retrieval, knowledge representation, automated reasoning, and machine learning technologies to the field of open domain question answering. In general, document search technology receives a keyword query and returns a list of documents, ranked in order of relevance to the query (often based on popularity and page ranking). In contrast, QA technology receives a question expressed in natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of a million books, per second. Sources of information for the Watson system include encyclopedias, dictionaries, thesauri, newswire articles, and literary works. The Watson system also uses databases, taxonomies, and ontologies.

BRIEF SUMMARY

Disclosed are a method, a data processing system, and a computer program product (embodied in a computer-readable storage device) for managing data in a cache memory of a question answering system.

A technique for caching evidence for answering questions in a cache memory of a data processing system (that is configured to answer questions) includes receiving a first question. The first question is analyzed to identify a first set of characteristics of the first question. A first set of evidence for answering the first question is loaded into the cache memory. A second question is received. The second question is analyzed to identify a second set of characteristics of the second question. A portion of the first set of evidence, whose expected usage in answering the second question is below a determined threshold, is unloaded from the cache memory.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for managing data in a cache memory of a question answering system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

As is known, general computing systems usually implement one or more levels of cache memory (cache) as a small fast memory where frequently used data is stored, such that the cached data can be accessed with lower latency. In a computing system that includes one or more levels of cache, when a processor requests data, the system first checks if the data resides in the cache. If the data resides in cache, the cache transfers the data to the processor. If the data does not reside in the cache, the data is fetched (e.g., by a main memory controller) from main memory or storage into the cache. To maintain the efficiency of a caching system, the size of the cache is relatively small compared to storage required for a QA system. As caches are generally relatively small, identifying what data to load into and retain in a cache may be challenging. There are multiple techniques (e.g., "most frequently used" or "most recently used") that may be employed to determine what data should be loaded into and retained within a cache.

When the Watson system receives a request for processing, data (evidence) has conventionally been loaded into cache for analysis. For example, when a cancer diagnostic request is received, related data or metadata has been loaded into cache memory (cache). The same data has also been conventionally unloaded when processing of the request has finished. When dealing with large amounts of data for a given request, frequent data loading and unloading can lead to relatively high delays in accessing desired data.

According to the present disclosure, in the example above, the cancer-related data may be held in the cache for a longer duration with the anticipation that the cancer-related data may be reused in the near future. For example, assuming the cancer-related data is annotated by the tuple <mutation, chemotherapy, mass>, if any of the three tuple elements match a next request, the cancer-related data may be held in cache for a longer duration. However, holding data in cache may not always provide the best result, as the cost of loading new data increases (i.e., the latency in accessing new data is increased). According to the present disclosure, techniques are disclosed that can opportunistically and dynamically load and unload data from a shared cache (e.g., a level 2 (L2) and/or a level 3 (L3) cache) of a QA system.

Conventionally, the Watson system has explored large amounts of structured and unstructured data to find candidate answers for a question (or a problem). As mentioned above, caching is a commonly used technique in computing to reduce the latency overhead in accessing data residing on different storage forms. According to the disclosure, techniques are disclosed that provide efficient caching techniques to speed-up response time of a QA system. In general, the disclosed techniques leverage candidate answer and evidence scoring mechanisms that are integral to QA systems, e.g., the Watson system, in prioritizing what data is cached by the QA system.

Figure 1:
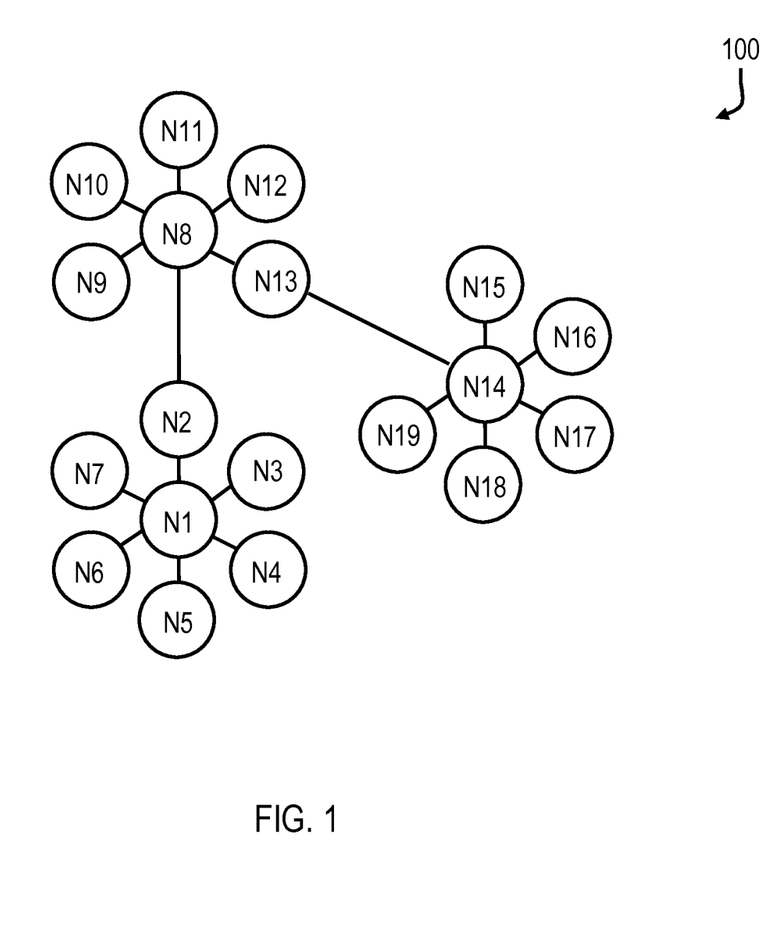
FIG. 1 is a diagram of an exemplary high performance computing (HPC) cluster that includes a number of nodes, with one or more of the nodes including multiple processors that share a cache memory (cache) managed according to various aspects of the present disclosure.

According to the present disclosure, candidate and evidence scoring mechanisms are employed to determine what data is loaded in a cache. According to various aspects of the present disclosure, techniques for performing high performance computing (HPC), or network computing, are described herein that dynamically determine what data is loaded in a shared cache of a node, which may include one or more symmetric multiprocessors (SMPs). With reference to FIG. 1, an example topology for a relevant portion of an exemplary HPC cluster (supercomputer) 100 includes a number of nodes (N1-N18) that are connected in, for example, a three-dimensional (3D) Torus topology. While eighteen nodes are illustrated in FIG. 1, it should be appreciated that more or less than eighteen nodes may be present in an HPC cluster configured according to the present disclosure.

Figure 2:
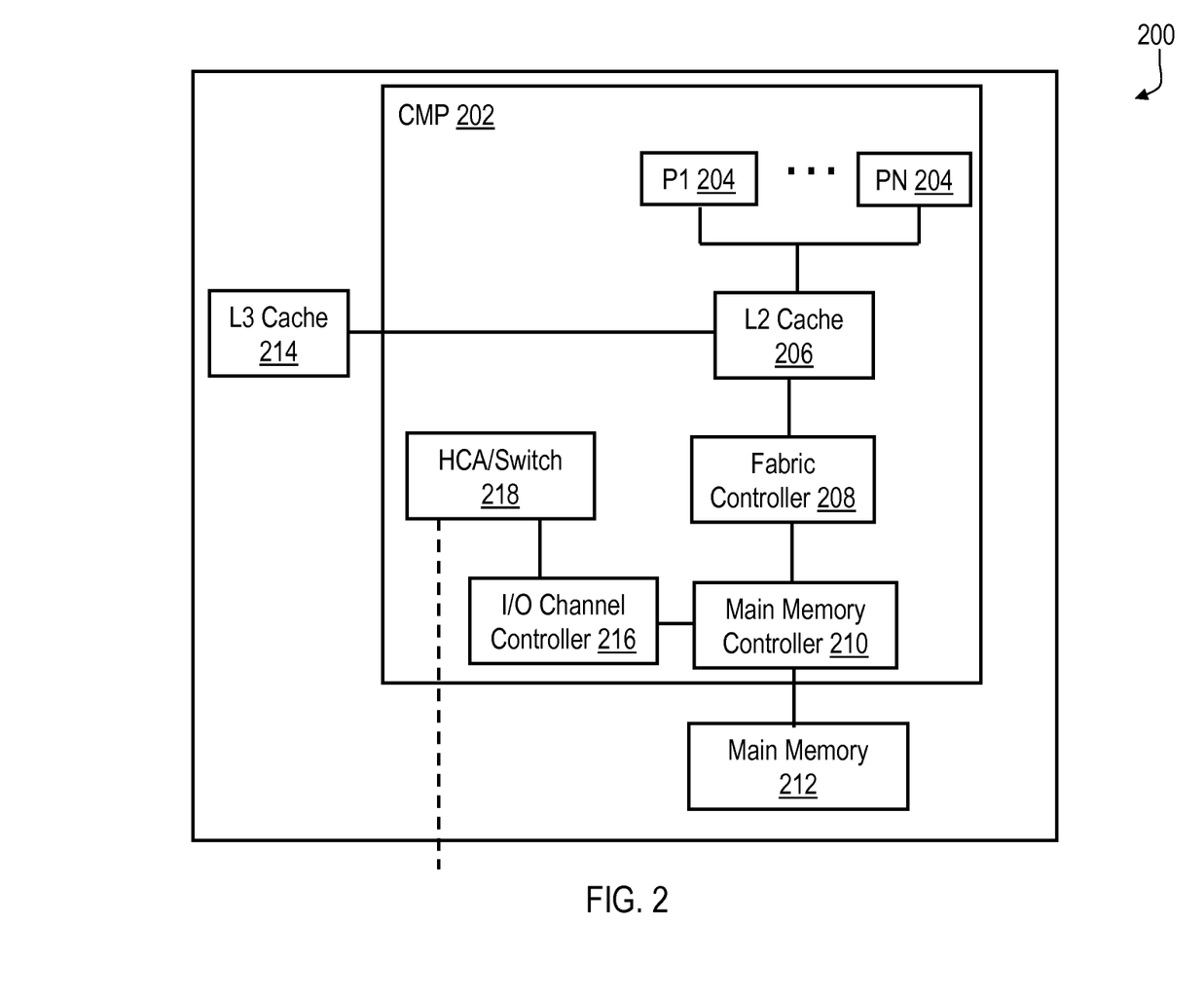
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

According to one or more embodiments, data is unloaded from a shared cache (e.g., L2 cache 206 of FIG. 2) gradually, as contrasted with unloading data from the shared cache using an all-at-once approach. In at least one embodiment, an unloading rate (UR) metric that controls the data unloading process is implemented. An actual value of the UR metric may be a function of different factors, e.g., question type, evidence size, question key characteristics (including the primary search attributes and how often the same type of question is being requested). In various embodiments, a UR metric is determined based on future requests to provide a predictive mechanism for data unloading in a QA system. The disclosed techniques may advantageously speed-up the loading time of evidence (data) in QA systems. As a result of improved data access, overall response time of a QA system may also be reduced.

According to one or more embodiments, a cache analysis engine that allows fast loading and gradual unloading of data used in QA system analysis may be implemented. The cache analysis engine may, for example, execute on one of processors 204 or be integrated into logic of a cache controller of a cache. Inputs to the cache analysis engine may include:

a current request; a subsequent 'N' requests (if available); a size of the evidence for the current request; a size of the evidence for a future request (if available); a primary search cache match; and how often the same question type is requested. In one or more embodiments, for a specific type of data, the engine computes the UR metric, e.g., in kilobits/second or megabits/second. The UR metric may be defined as the amount of data that is unloaded per unit time. In at least one embodiment, when a future question is unknown, the UR metric is only a function of the current question type and evidence size for the current question. In one or more embodiments, for a specific type of data, the cache analysis engine also computes a loading rate (LR) metric, e.g., in kilobits/second or megabits/second, that can be the same as or different from the UR metric. The LR metric is defined as the amount of data loaded per unit time. Conventionally, data has been unloaded from a cache solely based on a communication bandwidth between main (system) memory and the cache.

According to the present disclosure, data that is not currently used is slowly unloaded from cache. When a new request is received, the UR metric is updated based on the relevance of the new request with respect to annotated parameters of the data. In one or more embodiments, the value of UR metric for each hypothesis is lowered (resulting in a lesser amount of data associated with the hypothesis being unloaded from the shared cache) if the current data can be reused for future questions; otherwise the UR metric is increased (resulting in a greater amount of data associated with the hypothesis being unloaded from the shared cache). The data in a cache to be slowly unloaded may be selected based on relevance of cached data to questions currently received by a QA system.

According to the present disclosure, evidence is unloaded from cache based on relevance of the evidence to key terms in question analysis and how the evidence is utilized in top candidate answers. That is, evidence is not unloaded based solely on whether the evidence was 'last used' or 'frequently used', but more akin to how a QA system loads new data.

A primary benefit of 'smart unloading' is that a set of evidence associated with one question may be used by subsequent questions, based on characteristics of questions received by a question answering system. In various embodiments, all evidence for one question is not usually unloaded from cache at a same time. That is, only a portion of a set of evidence is unloaded from cache, and the evidence unloaded changes based on changing characteristics of subsequent questions. In general, question analysis, hypothesis generation (primary search), and scoring (evidence score) all factor in to how quickly and when evidence is unload from cache. A primary search corresponds to a set of attributes that form a query to find candidate answers from evidence. In various embodiments, for a given set of evidence that is to be unloaded, an unloading rate varies so as to not push evidence out of the cache too fast when the evidence is still slightly relevant.

When evidence is still slightly relevant, the evidence is unloaded from cache at a slower rate than when the evidence is not relevant, as the slightly relevant evidence may be used to answer subsequent questions. As one example, assume that a question answering system receives four questions. In this case, evidence is loaded into cache for a first question, and when a subsequent question is somewhat relevant to the first question, evidence from the first question may be unloaded at 50 kilobits/sec (based on size and relevance of the evidence with respect to a subsequent second question). Assuming a subsequent third question was slightly relevant to the first question, evidence from the first question may again be unloaded at 50 kilobits/sec (based on size and relevance of the evidence with respect to the third question). Assuming a subsequent fourth question has substantially no relevance to the first question, evidence associated with the first question may be unloaded at 200 kilobits/sec (assuming all evidence for the first question has not already been removed from cache).

Figure 3:
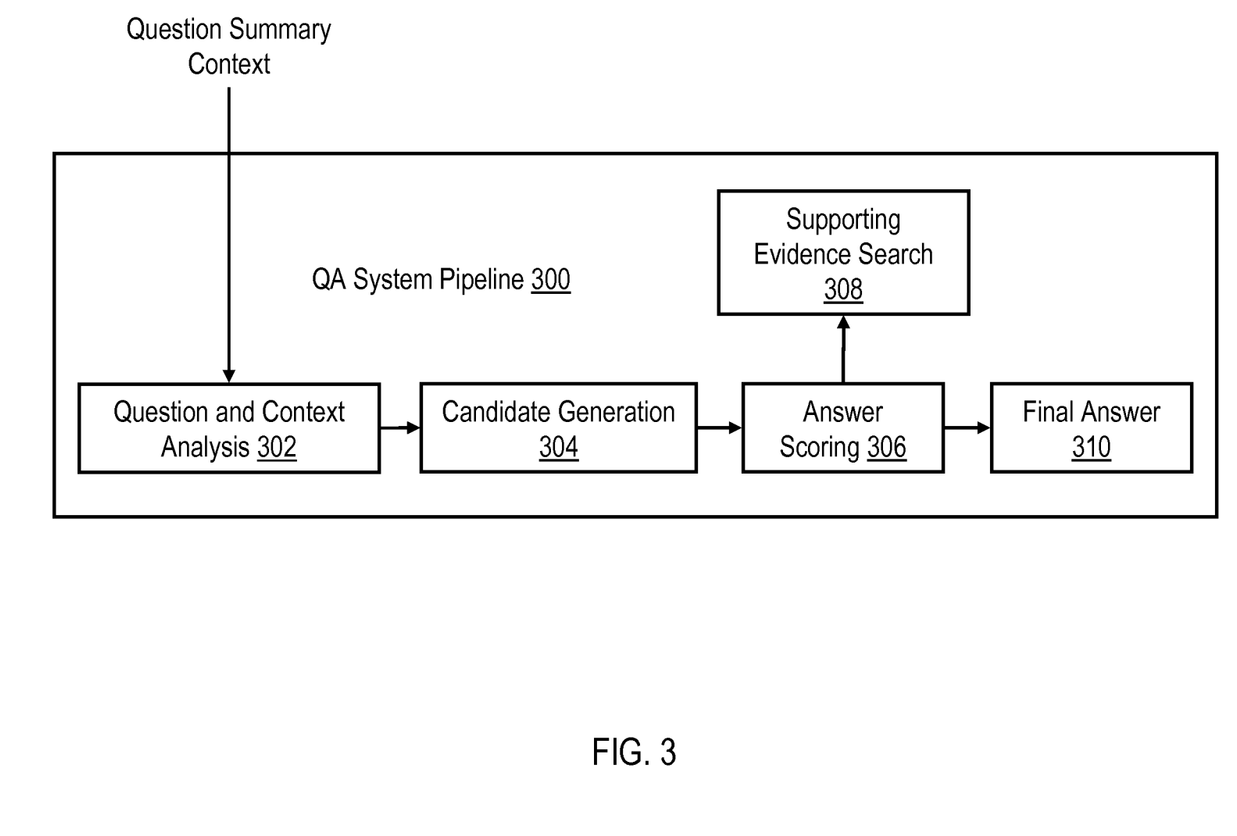
FIG. 3 depicts relevant components of an exemplary question answering (QA) system pipeline.

FIG. 3 illustrates relevant components of a question answering system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. A candidate generation block 304 of QA system pipeline 300 receives the output from question and context analysis block 302 at an input and generates candidate answers for the question. The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
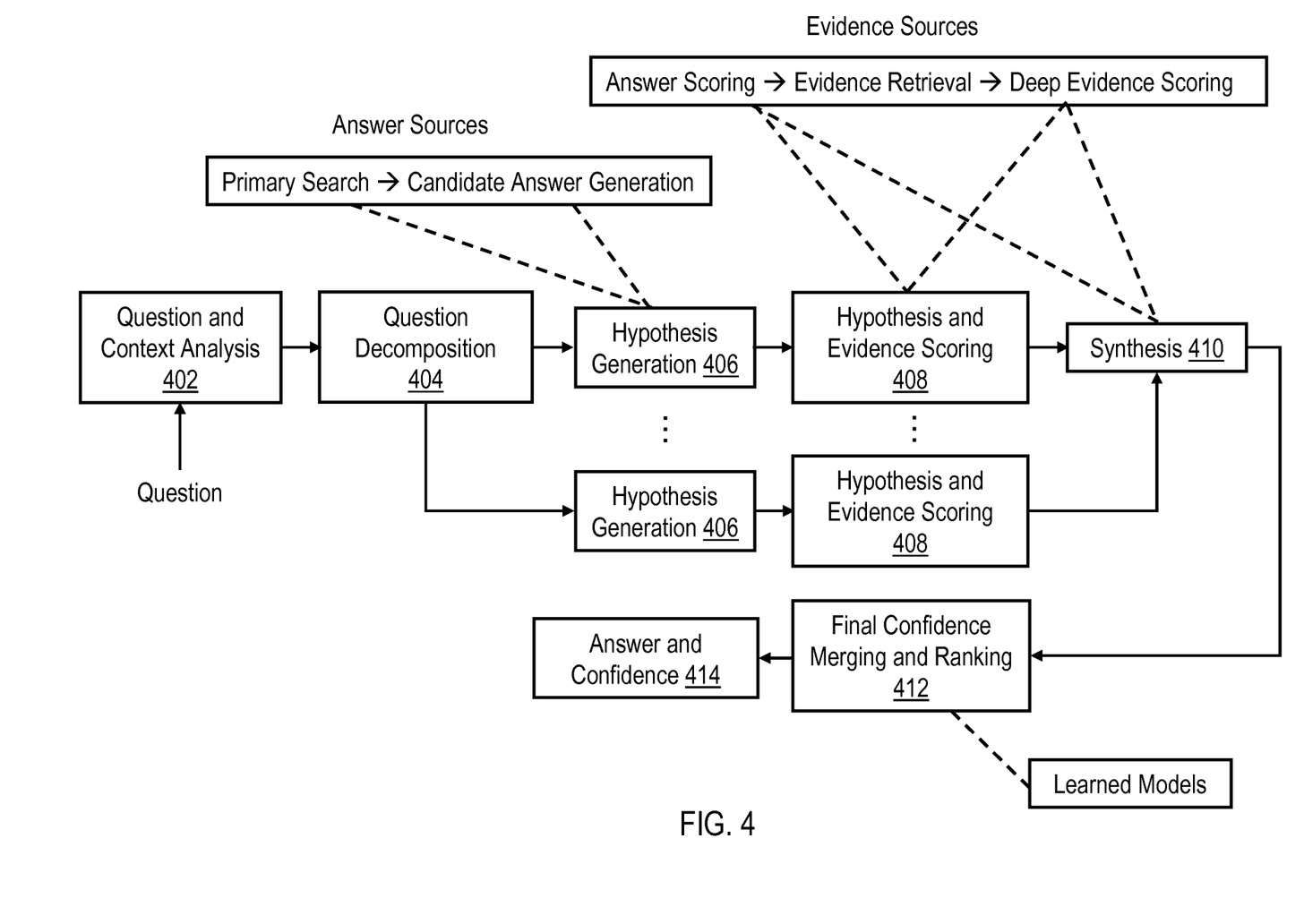
FIG. 4 depicts relevant components of the exemplary QA system pipeline in additional detail.

FIG. 4 illustrates relevant components of an exemplary QA system pipeline in additional detail. As is illustrated, question and analysis context block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in block 412, the QA system provides an answer (and may provide a confidence score) to the question. Assuming, for example, the candidate answers T, 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

Figure 5:
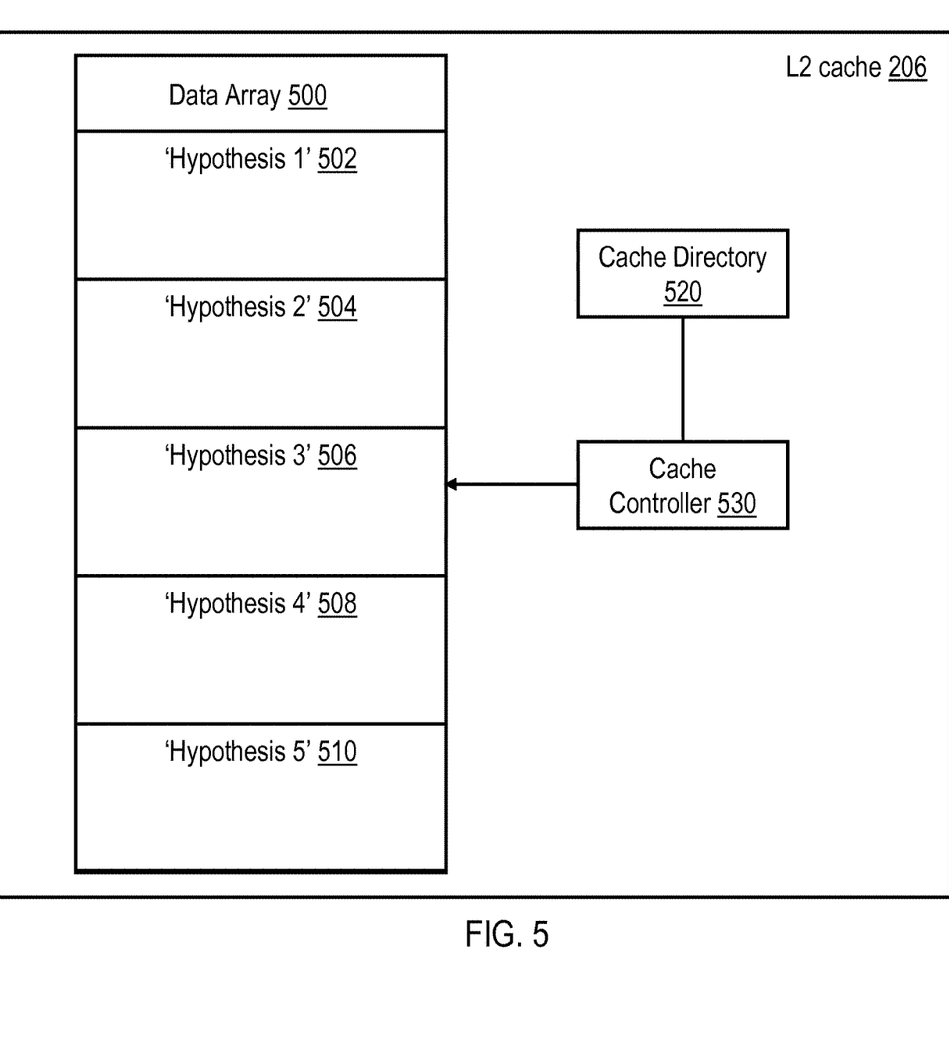
FIG. 5 depicts an exemplary allocation of data (associated with multiple hypotheses) to a shared cache of a QA system at one point in time.

With reference to FIG. 5, an exemplary allocation of data (associated with multiple hypotheses) loaded into L2 cache 206 at one point in time is illustrated. In FIG. 5, L2 cache 206 is illustrated as including a cache controller 530 coupled to a cache directory 530 and a data array 500, which currently stores data for five different hypotheses. Specifically, data array 500 currently stores equal amounts of data for hypotheses 502, 504, 506, 508, and 510 (labeled 'hypothesis 1', 'hypothesis 2', 'hypothesis 3', 'hypothesis 4', and 'hypothesis 5', respectively).

Figure 6:
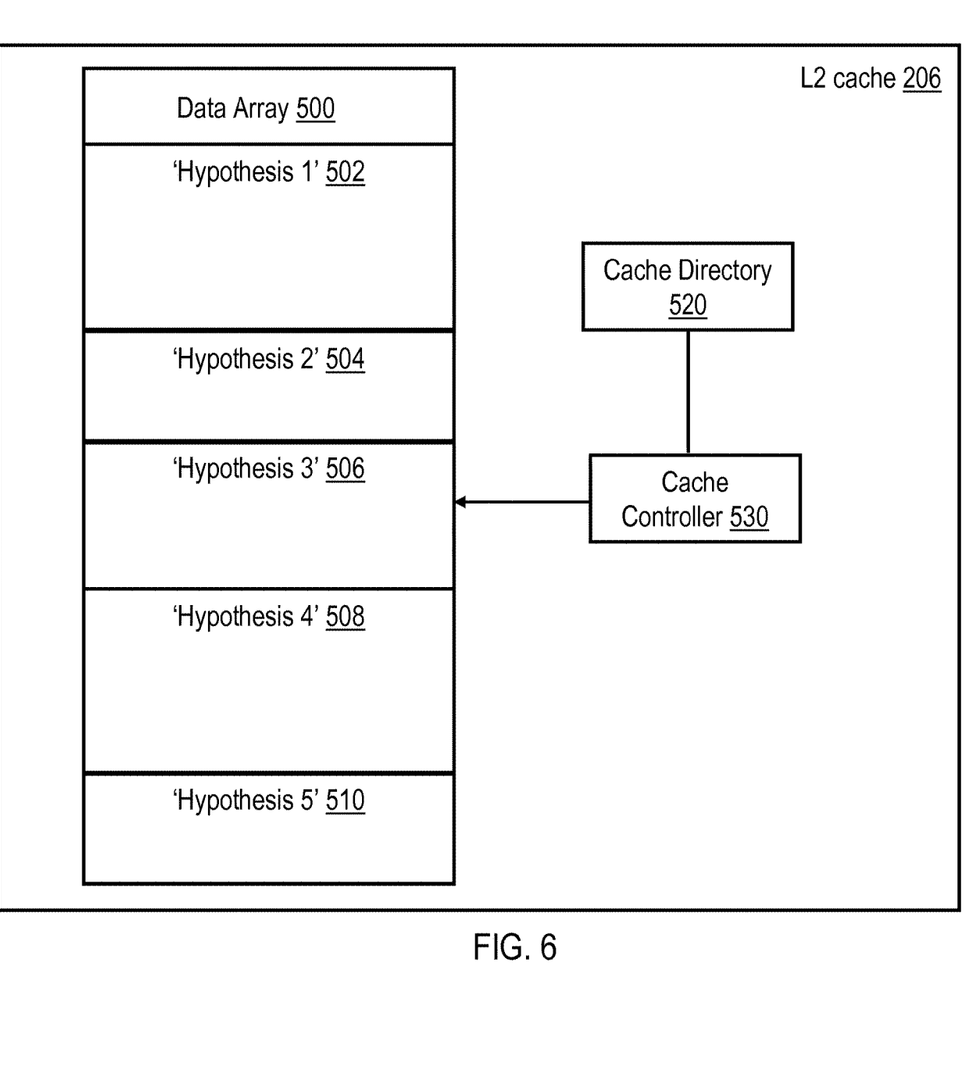
FIG. 6 depicts an exemplary allocation of data (associated with multiple hypotheses) to the shared cache of FIG. 5 at another point in time.

In contrast, with reference to FIG. 6, data array 500 is illustrated as storing more data for hypotheses 502 and 508 than hypotheses 504, 506, and 510. It should be appreciated that allocation of storage in L2 cache 206 for hypotheses 504 and 510 have been reduced, while the allocation of storage in L2 cache 206 for hypothesis 506 has remained the same. The allocation of storage depicted in FIG. 6 indicates that hypotheses 502 and 508 have yielded higher scored answers and, as such, additional data associated with hypotheses 502 and 508 have been loaded into data array 500. Similarly, hypotheses 504 and 510 have yielded the lower scored answers and, as such, data associated with hypotheses 504 and 510 have been reduced (i.e., drained or unloaded from L2 cache 206) to facilitate the increased allocation of storage for data for hypotheses 502 and 508. While storage in data array 500 associated with hypotheses 504 and 510 have been illustrated as being reduced equally, it should be appreciated that (depending on the scoring of the answers provided by the different hypotheses) storage in data array 500 associated with hypotheses 504 and 510 may be reduced in different amounts.

Figure 7:
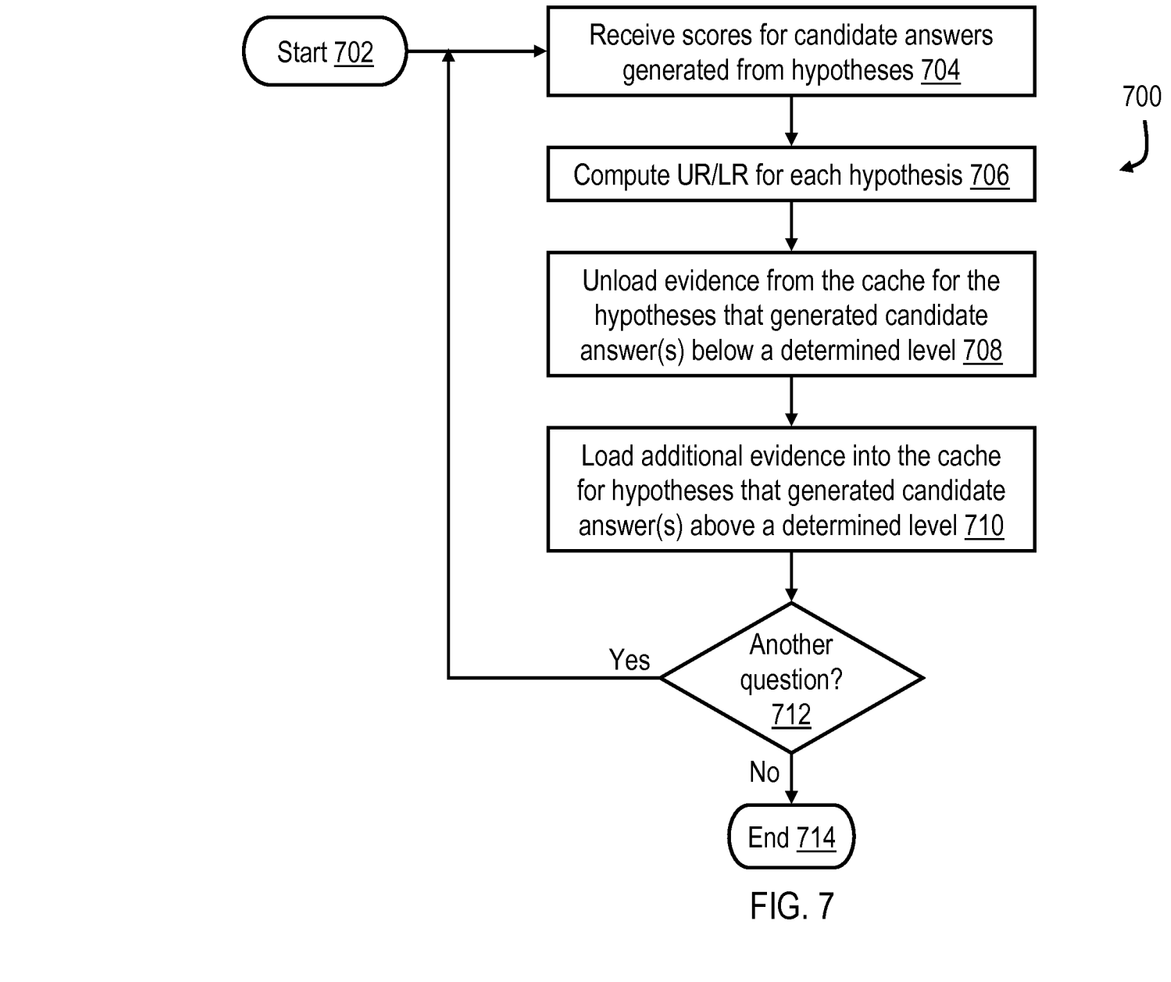
FIG. 7 is a flowchart of an exemplary process for managing data in a shared cache of a QA system, according to an embodiment of the present disclosure.

With reference to FIG. 7 a process 700 for managing data in a cache of a question answering system, according to aspects of the present disclosure, is illustrated. Process 700 may be implemented, for example, through the execution of one or more program modules (that are configured to function as a cache analysis engine) by one or more processors 204 of data processing system 200.

Process 700 may, for example, be initiated in block 702 in response to receipt of a question by data processing system 200. It should be appreciated that a question may be directed to virtually any question type or question area (e.g., healthcare, banking, geography, information technology, etc.). Next, in block 704, data processing system 200 receives scores for candidate answers generated from hypotheses associated with the received question, as described above with reference to FIGS. 3-4.

For example, a received question may be analyzed to determine various characteristics or factors, e.g., question type (e.g., human, disease, cancer, lung), evidence size associated with the question type, and characteristics of the question (e.g., primary search attributes and how often the same question type is received). Based on the analysis, multiple hypotheses for the received question may then be generated and evidence for each of the hypotheses may be loaded into L2 cache 206. One or more candidate answers may be generated for each of the hypotheses, based on the evidence loaded into L2 cache 206. The candidate answers may then be scored in a conventional manner.

Next, in block 706, data processing system 200 computes an unloading rate (UR) metric and/or a loading rate (LR) metric for each of the hypotheses. Then, control transfers from block 706 to block 708, where data processing system 200 unloads evidence at a computed UR metric from L2 cache 206 for hypotheses that generated the lowest scored candidate answer or answers or for hypotheses whose candidate answers scored below a determined level. As noted above, a UR metric may be a function of different factors, e.g., question type, evidence size, question key characteristics (including the primary search attributes and how often the same type of question is being requested), and/or how much cache memory is required by the new evidence that is to be loaded into L2 cache 206.

For example, the specific evidence to unload from L2 cache 206 may be determined by an expected usage based on statistical analysis. As one example, data processing system 200 may compare a first set of characteristics of a previous question to a second set of characteristics of a subsequent question to determine the expected usage for the first set of evidence. The first set of characteristics and the second set of characteristics may each include a question type, an evidence size, primary search attributes, and an evidence score that are respectively associated with the first and second questions. Next, in block 710, data processing system 200 loads additional evidence at a computed LR metric into L2 cache 206 for the hypotheses that generated the highest scored candidate answer or answers or an answer or answers with a score above a determined level. For example, an LR metric may also be a function of different factors, e.g., question type, evidence size, question key characteristics (including the primary search attributes and how often the same type of question is being requested), and/or how much cache memory is required by the new evidence that is to be loaded into L2 cache 206.

Next, in decision block 712, data processing system 200 determines whether another question has been received. In response to another question being received in block 712, control transfers to block 704. In response to another question not being received for a predetermined time period in block 712, control transfers to block 714 where process 700 terminates until a next question is received. It should be appreciated that additional evidence for a hypothesis related to previous questions may also be loaded into L2 cache 206 when a new question is not received for a predetermined time period.

Accordingly, techniques have been disclosed herein that advantageously manage data in a cache memory of a question answering system to reduce latency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product for managing cache memory of a question answering system, the computer program product comprising:
    a computer-readable storage device; and
    computer-readable program code embodied on the computer-readable storage device, wherein the computer-readable program code, when executed by a question answering system that includes a processor and a memory coupled to the processor, causes the question answering system to:
        receive a first question;
        analyze the first question to identify a first set of characteristics of the first question;
        load, based on a loading rate (LR) metric that defines an amount of data loaded per unit of time, a first set of evidence into the cache memory of the question answering system for answering the first question, wherein a value of the LR metric is a function of one or more of a question type, an evidence size, and a question key characteristic and how much of the cache memory is required by new evidence that is to be loaded;
        receive a second question;
        analyze the second question to identify a second set of characteristics of the second question;
        compare the first set of characteristics to the second set of characteristics to determine an expected usage for the first set of evidence in answering the second question; and
        unload, based on an unloading rate (UR) metric that defines an amount of data unloaded per unit of time, from the cache memory a portion of the first set of evidence based on the expected usage improves the ability of the question answering system in maintaining relevant evidence in the cache memory and thereby improves operation of the question answering system, wherein a value of the UR metric is lowered when current data loaded in the cache memory can be reused in answering a subsequent question and is increased when the current data loaded in the cache memory cannot be reused in answering the subsequent question and wherein the value of the LR metric is different than a value of the UR metric and is a function of one or more of the question type, the evidence size, and the question key characteristic.

2. The computer program product of claim 1, wherein the unloading a portion of the first set of evidence is performed at a rate that is based on a relevance of the first set of characteristics to the second set of characteristics.

3. The computer program product of claim 2, wherein the first set of characteristics and the second set of characteristics each include a question type, an evidence size, primary search attributes, and an evidence score that are respectively associated with the first and second questions.

4. The computer program product of claim 1, wherein the computer-readable program code, when executed by the data processing system, is further configured to cause the question answering system to load additional evidence for a hypothesis related to one of the first and second questions into the cache memory when another question is not received.

5. The computer program product of claim 1, wherein the cache memory is shared between processors of a node of a computing system that includes multiple nodes.

6. The computer program product of claim 1, wherein the unloading a portion of the first set of evidence is performed at a rate that is based on a relevance of the first set of characteristics to sub sequent question characteristics.

7. A question answering system, comprising:
    a cache memory; and
    a processor coupled to the cache memory, wherein the processor is configured to:
        receive a first question;
        analyze the first question to identify a first set of characteristics of the first question;
        load, based on a loading rate (LR) metric that defines an amount of data loaded per unit of time, a first set of evidence into the cache memory for answering the first question, wherein a value of the LR metric is a function of one or more of a question type, an evidence size, and a question key characteristic and how much of the cache memory is required by new evidence that is to be loaded;
        receive a second question;
        analyze the second question to identify a second set of characteristics of the second question;

compare the first set of characteristics to the second set of characteristics to determine the expected usage for the first set of evidence in answering the second question; and unload, based on an unloading rate (UR) metric that defines an amount of data unloaded per unit of time, from the cache memory a portion of the first set of evidence based on the expected usage improves the ability of the question answering system in maintaining relevant evidence in the cache memory and thereby improves operation of the question answering system, wherein a value of the UR metric is lowered when current data loaded in the cache memory can be reused in answering a subsequent question and is increased when the current data loaded in the cache memory cannot be reused in answering the subsequent question and wherein the value of the LR metric is different than a value of the UR metric and is a function of one or more of the question type, the evidence size, and the question key characteristic.

8. The question answering system of claim 7, wherein the unloading a portion of the first set of evidence is performed at a rate that is based on a relevance of the first set of characteristics to the second set of characteristics.

9. The question answering system of claim 8, wherein the first set of characteristics and the second set of characteristics each include a question type, an evidence size, primary search attributes, and an evidence score that are respectively associated with the first and second questions.

10. The question answering system of claim 7, wherein the processor is further configured to load additional evidence for a hypothesis related to one of the first and second questions into the cache memory when another question is not received.

11. The question answering system of claim 7, wherein the cache memory is shared between processors of a node and the data processing system is a computing system that includes multiple nodes.

* * * * *